(No Model.)  
J. T. F. CONTI.  
MOTOR CHARGING DEVICE.
No. 531,511. Patented Dec. 25, 1894.
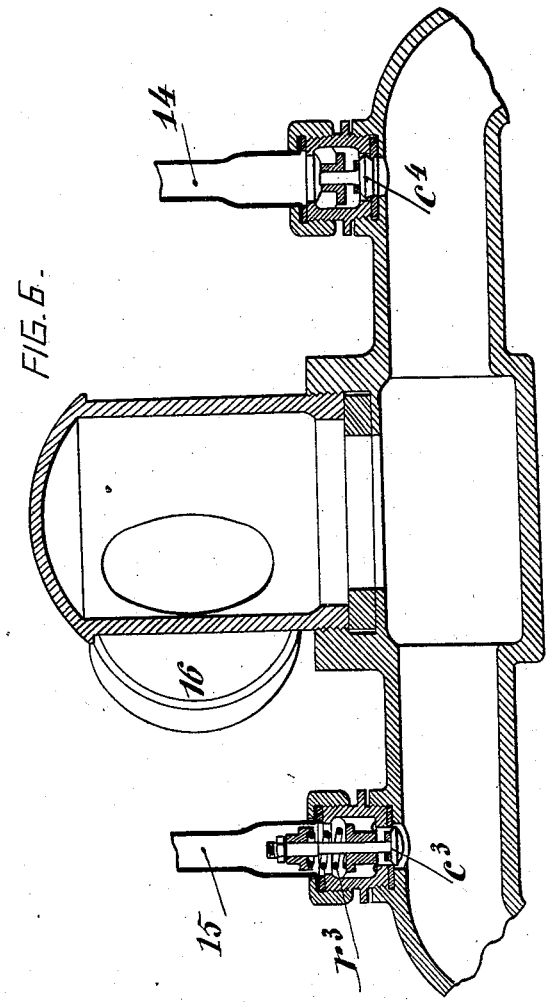
WITNESSES.  
INVENTOR:  
ATTORNEYS (No Model.)  J. T. F. CONTI.  5 Sheets—Sheet 5.
MOTOR CHARGING DEVICE.

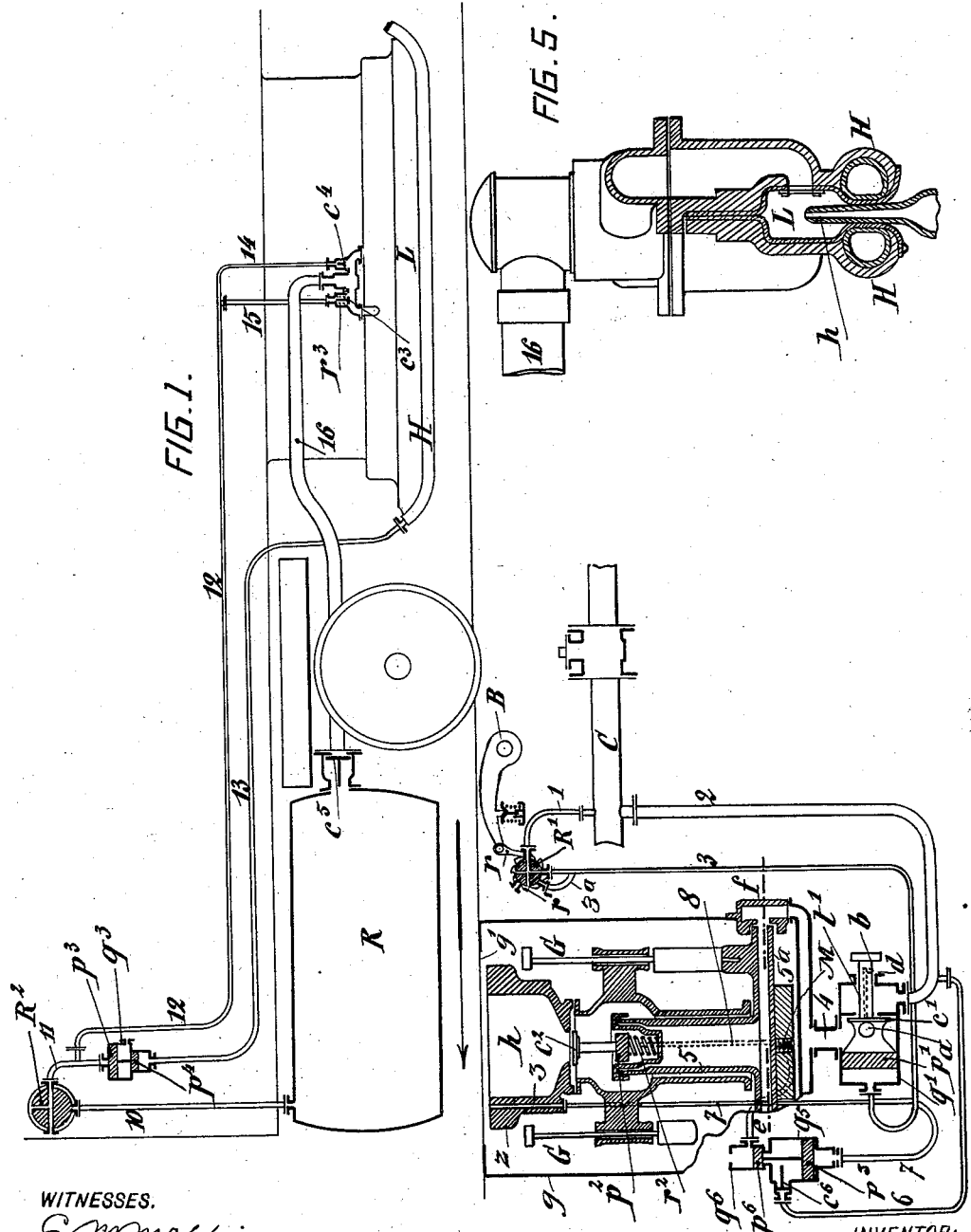

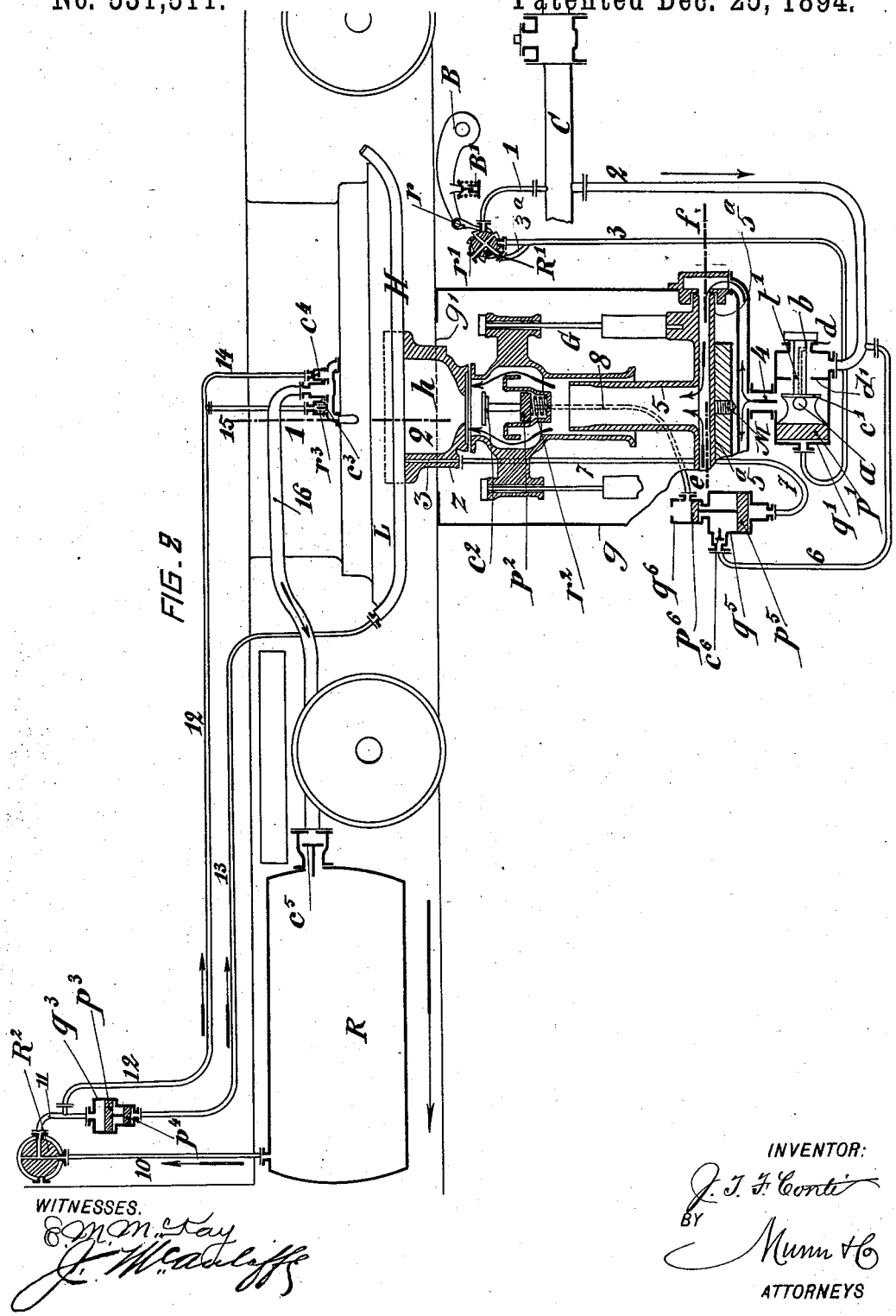

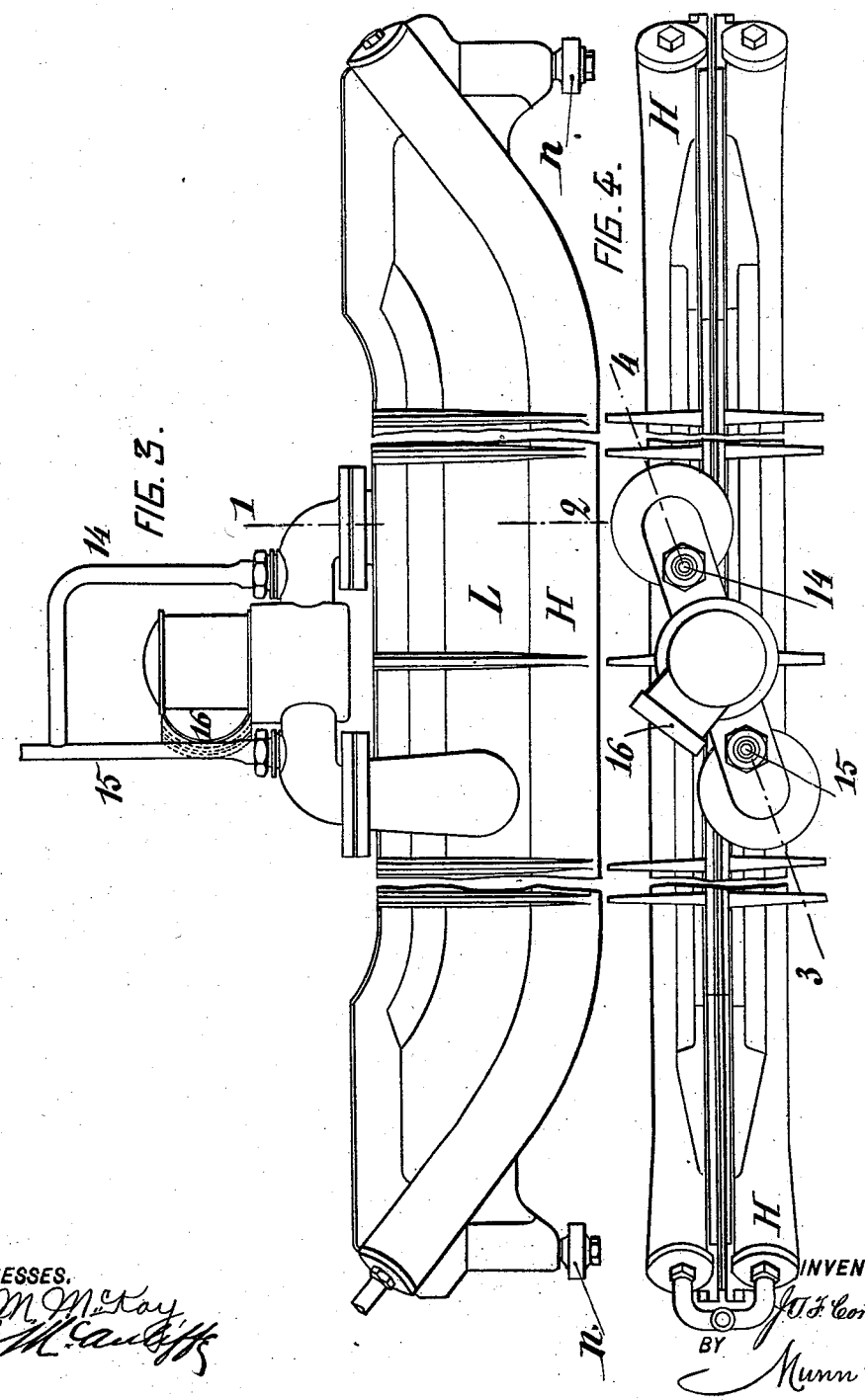

No. 531,511.  Patented Dec. 25, 1894.

UNITED STATES PATENT OFFICE.

JAMES TIBURCE FELIX CONTI, OF PARIS, FRANCE.

MOTOR-CHARGING DEVICE.

SPECIFICATION forming part of Letters Patent No. 531,511, dated December 25, 1894.

Application filed May 4, 1894. Serial No. 510,096. (No model.) Patented in Austria-Hungary April 20, 1893, No. 22,432 and No. 63,327 and in France May 27, 1893, No. 230,413.

*To all whom it may concern:*

Be it known that I, JAMES TIBURCE FELIX CONTI, of the city of Paris, France, have invented a new and useful Motor-Charging Device for Recharging the Reservoirs of Vehicles Propelled by Compressed Air or other Fluid Under Pressure, (for which I have obtained Letters Patent in France for fifteen years, dated May 27, 1893, No. 230,413, and in Austria-Hungary for fifteen years, dated April 20, 1893, No. 22,432 and No. 63,327,) of which the following is a full, clear, and exact description.

This invention has for its object to provide means for enabling the reservoirs of tramcars and other vehicles propelled by air or other fluid under pressure to be automatically recharged at certain points of their journey. For this purpose the motive fluid would be supplied through a main pipe laid below the ground level, in proximity to the line, from which branch pipes would lead to the points at which connection is made with the reservoir on the vehicle, by means of a delivery nozzle which rises at the moment the vehicle passes, and makes connection with a receiving device fixed beneath the vehicle in communication with the reservoir.

The details of the apparatus whereby the recharging of the reservoir is effected, are illustrated in the accompanying drawings, forming part of this specification, wherein—

Figure 7:
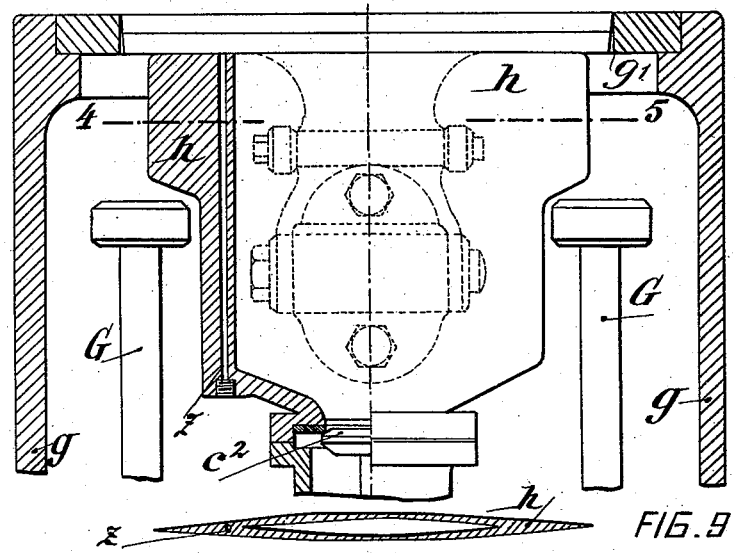
Figure 8:
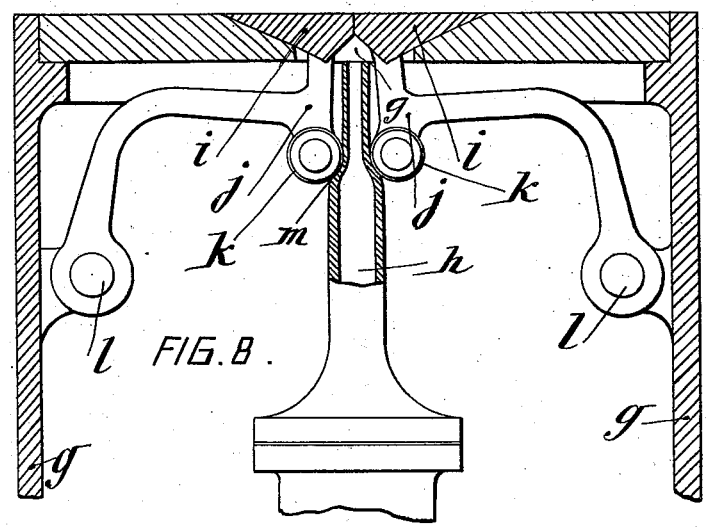

Figure 1 represents the position of the parts before the passage of the vehicle. Fig. 2 represents the arrangement of the parts while in connection. Fig. 3 is an elevation and Fig. 4 a plan of the receiving device. Fig. 5 is a transverse section on line 1—2, Fig. 3, of the delivery nozzle and receiving device in connection. Fig. 6 is a section on line 3—4, Fig. 4, and on a larger scale of the upper part of the receiving device. Figs. 7 and 8 show longitudinal and transverse sections of the delivery nozzle and means for shutting off the delivery of fluid. Fig. 9 is a section on line 4—5, Fig. 7, of the delivery nozzle.

The same letters and numerals of reference indicate the same parts in all the figures.

The main C, Figs. 1 and 2, is laid beneath the whole length of the route, and means are provided at given distances apart for recharging the reservoir R carried by the vehicle. The coupling is formed of a delivery nozzle $h$ of lenticular section shown in Fig. 9 which is caused to rise on the passage over it of the vehicle and enter a receiving device L which is carried at the bottom of the vehicle and is in communication with the reservoir R.

The mechanism placed beneath the line is actuated by means of a treadle B placed between the rail and guard rail so as to be depressed by the flange of the vehicle wheel and raised by a spring B'. By the depression of the treadle B a pawl $r$ pivoted to its extremity acts on a ratchet wheel $r'$ controlling a four-way cock R', the parts being arranged in such manner that the cock R' will make one-eighth of a turn at each depression of the treadle, the function of said cock being either to connect branch pipe 1 on the main C with the pipe 3 as in Fig. 1 or to place pipe 3 in communication with the atmosphere through the medium of its branch $3^a$ as in Fig. 2 according to whether the treadle B is operated an even or odd number of times.

The pipe 3 connects with the cylinder $q'$ on the rear side of the piston $p'$ which is provided with a valve $c'$ and a hollow stem $t'$ sliding in a stuffing-box $d$ and containing a passage $a$, $b$, said passage being for the purpose of putting the apparatus in communication with the atmosphere when valve $c'$ is closed against its seat $d'$. The fluid pressure is admitted to act on valve $c'$ through the pipe 2 branched upon the main C. The valve $c'$ controls the supply of air to the delivery nozzle through passage 4 and pipe 5 upon which the said nozzle slides up and down guided by rods G which are provided with stops for limiting the movement. The delivery nozzle or spigot member of the coupling $h$ is of the lenticular two edged tapering section shown in Figs. 7, 8, and 9, and it is so mounted as to be capable of lateral movement so as to enable it to follow the transverse oscillating movements of the vehicle and permit it to engage in the female member of the coupling or receiving device even when the latter is not exactly in the middle of the track. To this end the delivery nozzle and its guide rods are free to oscillate slightly about the horizontal axis $e, f$, and it is vertically maintained by a counter-balance weight suspended at M.

$q'$, $q^5$, $q^6$, are cylinders suitably disposed within the casing $g$.

The delivery through the nozzle is controlled by a valve $c^2$ pressed to its seat by a piston $p^2$ and spiral spring $r^2$. The space beneath the piston $p^2$ communicates with the cylinder $q^6$ by a flexible pipe 8 and receives pressure from the main, or is in communication with the external air, according to the position in cylinder $q^6$ of piston valve $p^6$ which is controlled by the piston $p^5$ working in cylinder $q^5$. The cylinder $q^5$ is connected by a pipe 6 with the pipe 2 and its lower end is connected by a flexible pipe 7 with a channel $z$ leading through the solid end of the delivery nozzle $h$. The cylinder $q^5$ is provided with a check valve $c^6$.

The casing $g$ is provided at its upper part with a slot $g'$ for the passage of the delivery nozzle $h$ the slot normally being closed by two shutters $i, i$, carried by arms $j$ pivoted at $l$ and operated by the rising motion of nozzle $h$ through shoulders $m$ thereon acting on friction rollers $k$, on the arms $j$ whereby the shutters $i$ are separated to allow the nozzle to pass. On the descent of the latter the shutters close by their own gravity.

The receiving part of the apparatus comprises a long socket or chamber L (Figs. 3, 4, 5 and 6) in the longitudinal axis of the vehicle, having at its under side a longitudinal mouth or slit which is normally closed by lips or membranes H of india rubber or other like material, inflated with water or other fluid under pressure between which lips the nozzle $h$ enters as shown in Fig. 5, a tight joint between the two being insured by means of the lips H, pairs of guide rollers $n$ being provided at each end of the device L for bringing the nozzle into alignment with the mouth.

The chamber L communicates with the reservoir R by the pipe 16 and check valve $C^5$, Fig. 1.

$R^2$ Figs. 1 and 2 is a three-way cock for putting pipes 11, 12, in communication with the reservoir through pipe 10 or with the external air. The pipe 11 connects with a cylinder $q^3$ in which is a piston $p^3$ operating a piston $p^4$ which compresses the fluid by which the lips H are inflated. The pipe 12 connects the pipe 11 with the pipes 14, 15 which communicate with the interior of the chamber L by valves $c^4$, $c^3$, which open in reverse direction.

The action of the apparatus is as follows: The several parts being in the position represented in Fig. 1, the leading wheel of the car depresses the treadle B, moves cock R' (Fig. 2) one-eighth of a turn whereby the pipe 3 which was in communication with the main C, is open to the atmosphere as shown in Fig. 2. The space behind the piston $p'$ being thus open to the air the piston is suddenly moved by the pressure in pipe 2 acting on valve $c'$ which opens and establishes communication between the pipe 2 and the pipes 4 and 5, at the same time that the passage $b$ is closed to the open air. The compressed air enters passage 5 through its hollow trunnions $5^a$ raises the delivery nozzle $h$ which opens the shutters $i$ above described to allow the nozzle to pass. The vehicle continuing to advance, the nozzle guided by the rollers $n$ enters between the lips H, whereupon the driver stops the vehicle and turns cock $R^2$ so as to place the reservoir R in communication with pipes 11 and 12, it being assumed that the reservoir is never entirely exhausted and that it always contains some air under pressure on arriving at the point of intake. This pressure acting on pistons $p^3$, $p^4$ puts under pressure the water contained in the lips H to insure an airtight joint between them and nozzle $h$. The area of piston $p^3$ being greater than that of piston $p^4$ the pressure in the lips H will also exceed that in pipe 12 and consequently that in the chamber L. The pressure by which the lips are expanded and pressed against the nozzle is thus always proportional to the pressure in the reservoir and the greater the latter the more perfect will be the joint. The compressed air remaining in the reservoir R enters chamber L through valve $c^3$, the opening of the latter being slightly retarded by the spiral spring $r^3$ placed beneath it, for the expansion of the lips and to prevent any escape of air. This air pressure now opens valve $c^2$ of nozzle $h$ which cannot again close as long as the under side of piston $p^2$ is open to the outer air. The areas of the valve $c^2$ and piston $p^2$ and the strength of spring $r^2$ are such that a feeble pressure suffices to quickly open the valve $c^2$. The compressed air from the main C then passes through pipe 5 to the nozzle $h$, thence through chamber L to the reservoir R. When the pressure in the reservoir is about equal to the initial pressure in the main C, the piston $p^5$ will be nearly in equilibrium and the piston $p^6$ will rise and admit the pressure through pipe 8 to the under side of piston $p^2$ which being then in equilibrium as regards air pressure is raised by its spring and closes valve $c^2$. The charging operation which has occupied but a few seconds only is now completed and the driver, who watches his pressure gage, moves cock R' back to its original position (Fig. 1) opening pipe 11 and the upper side of piston $p^3$ to the outer air. The water under pressure contained in the lips H raises piston $p^4$ until equilibrium is established between the pressure of the water and that of the atmosphere whereupon the nozzle is released and the vehicle is ready to start again. The flange of the rear wheel then again depresses the treadle B so as to move cock R' another one-eighth of a turn, whereby the pressure from the main C is admitted through pipe 3 to the rear of piston $p'$ causing valve $c'$ to close on its seat and open the orifice $b$ in valve rod $t'$ to the outer air so that the pressure in passages 4 and 5 will exhaust through $a$, $b$, and the nozzle will redescend by its own weight and the shutters $i, i,$ will close. The delivery nozzle might be mounted upon the vehicle and serve as the receiving device.

My improvements may also be applied to other self-propelled vehicles, as well as to locomotives operated by compressed air. In the latter case the connection might be made with a receiving device on the vehicle hauled and connected by means of flexible tubing with reservoirs on the locomotive.

I claim—

1. The herein-described apparatus for charging the storage reservoirs of vehicles with a fluid under pressure comprising a receiving chamber on the vehicle, in communication with the reservoir thereof, the casing of such chamber having an opening, extending longitudinally of its bottom and a charging nozzle connected with a suitable source of supply and arranged at the track or line of travel of the vehicle, and means for vertically moving such nozzle into the path of one end of said chamber to cause it to enter said opening at one end and remain stationary relatively to longitudinal movement of the chamber in passing on or off the nozzle, substantially as described.

2. The herein-described apparatus for charging the storage reservoirs of vehicles with a fluid under pressure, comprising a receiving chamber on the vehicle, in communication with the reservoir thereof, the casing of such chamber having an opening, extending longitudinally of its bottom and provided throughout its length with normally contracting yielding lips, and a charging nozzle connected with a suitable source of supply and arranged at the track or line of travel of the vehicle, and means for vertically moving such nozzle into the path of one end of said chamber to cause it to part said lips, and enter the opening and remain relatively stationary to the longitudinal movement of the chamber, substantially as described.

3. The herein-described apparatus for charging the storage reservoirs of vehicles with a fluid under pressure, comprising an elongated receiving chamber supported on the vehicle and in communication with the reservoir to be charged, guides arranged at the front end of the casing of said chamber, and the said casing having an opening in its under side, a charging nozzle communicating with a suitable source of supply, and means for vertically moving said nozzle, substantially as described.

4. The herein described apparatus for charging the storage reservoirs of vehicles with a fluid under pressure, comprising a main along the track or line of travel of the vehicles, vertically movable valve nozzles adapted to communicate with the main, and means for automatically raising said nozzles, said means including a trip operated by the vehicle and the movement of which trip serves to establish communication between the main and the nozzle, substantially as described.

5. In apparatus of the character described, a series of vertically movable nozzles, a source for supplying fluid under pressure, and actuating devices for raising the nozzles, the said devices being operated by the fluid, substantially as described.

6. In apparatus of the character described, the combination with the vertically movable nozzles and a fluid supply, of a piston valve controlling the admission of the fluid to the nozzle, a cock controlling the admission of the fluid to the chamber of the piston valve, and a trip adapted to be actuated by the vehicle to be charged and serving to operate said cock, substantially as described.

7. In apparatus of the character described, charging nozzles having a vertical and a lateral rocking movement, substantially as described.

8. An apparatus for charging the storage reservoirs of vehicles with a fluid under pressure, comprising a chamber for receiving a charging nozzle, a charging nozzle, a source of supply, means for establishing communication between the nozzle and the source of supply, and a valve for cutting off the passage of fluid through the nozzle, said valve having means for automatically closing it when the pressure in the reservoir equals that of the fluid supplied, substantially as described.

9. In apparatus of the character described, the combination with a casing, of a vertically movable nozzle, the casing having an opening for the outward passage of the nozzle, and shutters normally closing such opening and adapted to be raised by the nozzle, the said shutters being provided below their meeting edges with operating devices spaced apart to receive the nozzle between them in its upward movement substantially as described.

10. In the herein-described apparatus the means whereby the receiving device may be put in communication with the reservoir on the vehicle or with the open air, consisting of a three-way cock and pipe connections as described in combination with flexible tubular lips on said receiving device filled with water or other fluid and means whereby the air pressure in the reservoir is caused to act thereon and expand the same, substantially as described.

The foregoing specification of apparatus for recharging the reservoirs of vehicles propelled by compressed air or other fluid under pressure signed by me this 22d day of March, 1893.

JAMES TIBURCE FELIX CONTI.

Witnesses:
CLYDE SHROPSHIRE,
ALBERT MOREAU.